United States Patent [19]

Staudigl

[11] Patent Number: 4,583,997

[45] Date of Patent: Apr. 22, 1986

[54] PROCESS FOR REDUCING THE HYDROXYL CONTENT OF OPTICAL WAVEGUIDES

[75] Inventor: Rudolf Staudigl, Burghausen, Fed. Rep. of Germany

[73] Assignee: Wacker-Chemitronic Gesellschaft fur Elektronik Grundstoffe mbH, Burghausen, Fed. Rep. of Germany

[21] Appl. No.: 659,285

[22] Filed: Oct. 10, 1984

[30] Foreign Application Priority Data

Oct. 25, 1983 [DE] Fed. Rep. of Germany ....... 3338714

[51] Int. Cl.⁴ ............................................. B01D 53/04
[52] U.S. Cl. .......................................... 55/31; 55/33; 55/35; 55/75; 65/3.12
[58] Field of Search ......................... 55/31, 33, 35, 75; 65/3.12, 3.13

[56] References Cited

U.S. PATENT DOCUMENTS

| 3,531,916 | 10/1970 | Kulperger et al. | 55/33 |
| 3,808,773 | 5/1974 | Reyhing et al. | 55/31 |
| 4,282,196 | 8/1981 | Kometani et al. | 423/337 |
| 4,310,341 | 1/1982 | Barns et al. | 65/3.12 |
| 4,338,111 | 7/1982 | Edahiro et al. | 65/3.12 X |
| 4,389,230 | 6/1983 | Modone et al. | 65/3.12 |
| 4,445,918 | 5/1984 | Modone et al. | 65/3.12 |
| 4,504,297 | 3/1985 | Kosinski et al. | 65/3.12 X |

FOREIGN PATENT DOCUMENTS

| 68388 | 1/1983 | European Pat. Off. . | |
| 2202787 | 7/1973 | Fed. Rep. of Germany | 65/3.12 |
| 2313250 | 10/1973 | Fed. Rep. of Germany . | |
| 18716 | 2/1977 | Japan | 65/3.12 |
| 4027 | 1/1978 | Japan | 65/3.12 |
| 30349 | 3/1978 | Japan | 65/3.12 |
| 156022 | 12/1979 | Japan | 65/3.12 |
| 67537 | 5/1980 | Japan | 65/3.12 |

OTHER PUBLICATIONS

Brongersma et al., "The Preparation of Alkali-Germanosilicate Optical Fibres Using the Double Crucible System", ACTA Electronica, 22, 3, 1979, 245–254.
Modone et al., "OH Reduction in Preforms by Isotope Exchange", CSELT Rapporti Tecnici–vol. IX, No. 6–Dec. 1981, pp. 621–623.

Primary Examiner—Robert Spitzer
Attorney, Agent, or Firm—Collard, Roe & Galgano

[57] ABSTRACT

The inert or oxidizing auxiliary gases used in the manufacture of optical waveguides often contain traces of water which can be the cause of disruptive OH groups in the glass fiber. According to the invention, this disruption is overcome by reducing the hydroxyl content of optical waveguides by treating the auxiliary gases with heavy water ($D_2O$), so as to replace the hydrogen atom in the OH groups with deuterium, and then subjecting the gases to a drying step. Preferably, the auxiliary gases are subjected to a preliminary drying prior to treatment with $D_2O$.

8 Claims, No Drawings

PROCESS FOR REDUCING THE HYDROXYL CONTENT OF OPTICAL WAVEGUIDES

The invention relates to a process for reducing the hydroxyl content of optical waveguides.

A major cause of attenuation in optical waveguides is absorption by vibration bands of hydroxyl groups which occur, within the relevant range of wavelengths, at 0.945 μm, 1.24 μm and 1.38 μm. It is therefore desirable to keep the hydroxyl content of optical fiber waveguides as low as possible or to shift the absorption bands into the longer wavelength region by replacing the hydrogen in the hydroxyl groups by deuterium.

It is known, e.g., from U.S. Pat. No. 4,282,196, to partially hydrolize the glass-former silicon tetrachloride by adding water prior to its reaction to form vitreous silica and to adsorb the impurities present in the resulting gel. It is possible, using heavy water ($D_2O$), to reduce the disadvantageous effect of the OH groups originating from the hydrolysis water; OH groups from other sources, however, are not affected by this measure.

It is further known from DE-OS 23 13 250 to carry out the oxidation of the glass-former in the presence of deuterium ($D_2$), whereby the corresponding OD groups are incorporated into the glass instead of OH groups. This process involves high costs owing to the combustion of expensive deuterium and only prevents OH groups from forming and being incorporated into the glass during the combustion operation itself.

An important and troublesome source of OH groups in optical waveguides has, however, been overlooked by the processes mentioned, namely the inert and oxidizing gases which are used in the manufacture of optical fiber waveguide material and which, even after careful drying, always have a residual water content which, although small, is detectable.

Such gases as helium, neon, argon, nitrogen, oxygen, nitrous oxide, nitric oxide, carbon dioxide, the Freons, e.g., difluorodichloromethane, and the halogens, e.g., chlorine gas, hereinafter referred to as "auxiliary gases", are those used primarily as carrier gases or oxidizing agents in the manufacture of glass fibers.

It is therefore an object of the present invention to provide a process which minimizes the water content of the inert and oxidizing gases as a source of OH groups in optical fiber waveguide material.

This object is accomplished by a process which first requires the treatment of the auxiliary gases with heavy water ($D_2O$) followed by subjecting such gases to a drying step.

In a preferred embodiment of the process, the auxiliary gases are subjected to an additional drying step prior to being treated with the heavy water. This would ensure that the contamination of the heavy water ($D_2O$) with "light" water ($H_2O$) can be kept to a minimum. However, this prior drying step is not absolutely necessary and, in principle, can be omitted.

Suitable drying methods would be those generally known to persons skilled in the art. Such methods include, e.g., drying by condensing out or freezing out, absorptive drying, e.g., using $P_4O_{10}$, or, preferably adsorptive drying, e.g., using silica gel, or, advantageously, using molecular sieves, e.g., those that can be obtained under the designation "Lindes molecular sieves". It is also possible to use commercially available drying cartridges.

Especially, for the drying step following treatment of the gases with $D_2O$, most recommended are those drying processes in which the expensive heavy water can be recovered, e.g., by desorption, and returned to the process.

The treatment of auxiliary gases with heavy water can also be carried out by conventional methods. For example, the $D_2O$ may be added to the gases in the form of a vapor sprayed or atomized in liquid form. It is more advantageous, however, to convey, preferably by bubbling, the gases through a bath of heavy water. In this case, it has been proven desirable to have gas bubbles with the smallest possible diameters, e.g., those with diameters of between 0.1 and 0.5 mm, and the longest possible dwell times in order to permit saturation of the gases with $D_2O$. It is further possible to heat the heavy water bath so as to increase the vapor pressure and thereby increase the heavy water content of the gaseous phase.

Advantageously, the heavy water ($D_2O$) used should have the smallest possible concentration of "light" water ($H_2O$). A $D_2O$ concentration of at least 90% by weight, preferably 99% by weight, has proven useful, although, in principle, lower $D_2O$ contents of water are also suitable.

In the course of the treatment step, the gaseous phase may retain or absorb that amount of water consistent with the existing saturation vapor pressure. This saturation vapor pressure is the sum of the partial pressures of the types of water molecules present, i.e., "light" water ($H_2O$), "semi-heavy" water (HDO) and "heavy" water ($D_2O$). Since these partial pressures are directly proportional to the particular molar fractions, it is possible to obtain a gas having a negligible OH concentration if the $H_2O$ concentration is kept to a minimum and the $D_2O$ concentration is maximized.

According to a preferred embodiment of the invention, the gas to be treated is subjected to a careful drying step prior to treatment with heavy water in order to remove as thoroughly as possible any light water present. The pre-dried gas is then enriched with heavy water, if possible, until the saturation vapor pressure is reached. Finally, in the subsequent drying step, as much water as possible is again removed from the auxiliary gas in order to avoid possible disturbances by $D_2O$ in the subsequent processes. The resulting gas then contains only traces of $D_2O$ and, in comparison, negligible amounts of $H_2O$.

Thus, the inventive process makes it possible to eliminate the troublesome effects of the light water introduced by the auxiliary gases when manufacturing optical waveguides, especially when the IVPO (inside vapor phase oxidation), OVPO (outside vapor phase oxidation), or the VAD (vapor axial deposition) processes are used. It is in principle possible to use the inventive process for the manufacturing processes of glasses having low attenuation values in the range of the OH vibration bands.

In the following, the invention will be more fully described in a number of examples, but it should be understood that these are given by way of illustration only, and not of limitation.

EXAMPLE 1

Oxygen gas provided as oxidizing agent in the manufacture of optical waveguides was dried, using a molecular sieve (3 Å), to a light water ($H_2O$) content of approximately 50 ppm by weight. The oxygen gas was then introduced into a gas-washing bottle filled with approximately 500 ml of very pure $D_2O$ ($D_2O$ content 99.9% by weight, temperature 25° C.) and bubbled through the liquid via a fritted plate, in the form of fine gas bubbles.

The emerging oxygen gas, which had been treated with $D_2O$, was then conveyed past a plurality of cooling fingers, cooled by means of liquid nitrogen, thus causing a very large proportion of the $D_2O$ to condense out. In order to remove the remaining traces of heavy water, the gas flow was finally passed through a drying tower coated with phosphorus pentoxide and another drying tower coated with a molecular sieve (3 Å).

Subsequent infra-red spectroscopic analysis of the resulting oxygen gas revealed only the absorption bands characteristic of $D_2O$, at 1180 $cm^{-1}$ and 2790 $cm^{-1}$ while the typical $H_2O$ bands, at 1595 $cm^{-1}$ and 3700 $cm^{-1}$, could no longer be detected.

The residual $D_2O$ content of the oxygen was still approximately 30 ppm by weight and could be reduced, by using commercially available drying cartridges, to the value of less than 1 ppm by weight required in the manufacture of optical waveguides.

EXAMPLE 2

Argon that had previously been dried using a molecular sieve and had a residual $H_2O$ content of 50 ppm by weight was introduced into a flask which was provided with a reflux condenser and in which approximately 250 ml of $D_2O$ was being maintained at boiling. First the gas flow was bubbled through the boiling $D_2O$, thus saturating the argon gas with $D_2O$. Then, in a manner analogous to that of Example 1, the gas was subjected to the various drying techniques of freezing out, treatment with phosphorus pentoxide and treatment with a molecular sieve. After finally flowing through a commercially available drying cartridge, the argon flow had a residual water content ($D_2O$) of less than 1 ppm by weight; it was not possible to detect any light water ($H_2O$) by infra-red spectroscopy.

The heavy water frozen out by the cooling fingers or retained in the molecular sieve could then be recovered by thawing or regeneration and returned to the supply of $D_2O$.

Thus, while only several embodiments and examples of the invention have been described, it will be obvious that many changes and modifications may be made thereunto, without departing from the spirit and scope of the invention.

What is claimed is:

1. In a process for reducing the hydroxyl content of optical waveguides of the type including the step of manufacturing the optical waveguide in the presence of an auxiliary gas selected from the group consisting of inert and oxidizing gases, the improvement comprising the steps of:
    (a) prior to said manufacturing step, pretreating the auxiliary gases with heavy water ($D_2O$); and
    (b) subsequently drying the auxiliary gas so as to minimize the water content of the auxiliary gas, thereby, in turn, minimizing the possibility of the auxiliary gas serving as a source of hydroxyl groups when manufacturing said optical waveguides in the presence of said auxiliary gas.

2. The process as recited in claim 1, additionally including the step of drying said auxiliary gases prior to pretreatment with heavy water.

3. The process as recited in claim 1, wherein said pretreating step is carried out by bubbling said auxiliary gases through a bath of heavy water.

4. The process as recited in claim 3, wherein said bubbling is controlled so as to produce gas bubbles having diameters between 0.1 –0.5 mm in order to permit saturation of the gases with $D_2O$.

5. The process as recited in claim 3, further comprising the step of heating said heavy water bath so as to increase the vapor pressure and thereby increase the heavy water content of an equilibrium-produced gaseous phase with said heavy water bath.

6. The process as recited in claim 6, wherein the heavy water bath has a $D_2O$ concentration in excess of 99% by weight.

7. The process as recited in claim 1, wherein said drying step is accomplished by adsorptive drying using molecular sieves.

8. The process as recited in claim 1, wherein said drying step is accomplished by desorption so that the heavy water can be recovered and reused in the process.

* * * * *